US007910197B2

(12) United States Patent
Dietsche et al.

(10) Patent No.: US 7,910,197 B2
(45) Date of Patent: Mar. 22, 2011

(54) RADIATION-CURABLE PAINT SYSTEMS HAVING A LOWER LAYER WITH LOW-TEMPERATURE ELASTICITY

(75) Inventors: Frank Dietsche, Schriesheim (DE); Thomas Jaworek, Kallstadt (DE); Reinhold Schwalm, Wachenheim (DE); Martin Weber, Maikammer (DE); Helmut Steininger, Worms (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/519,841

(22) PCT Filed: Jul. 16, 2003

(86) PCT No.: PCT/EP03/07709

§ 371 (c)(1), (2), (4) Date: Jan. 12, 2005

(87) PCT Pub. No.: WO2004/009251

PCT Pub. Date: Jan. 29, 2004

(65) Prior Publication Data

US 2005/0260405 A1 Nov. 24, 2005

(30) Foreign Application Priority Data

Jul. 23, 2002 (DE) .................................. 102 33 521

(51) Int. Cl.
*B32B 7/02* (2006.01)

(52) U.S. Cl. ......... 428/213; 428/332; 428/515; 428/520

(58) Field of Classification Search .................. 428/520, 428/521, 515, 213, 332
See application file for complete search history.

(56) References Cited

U.S. PATENT DOCUMENTS

| | | | | | |
|---|---|---|---|---|---|
| 3,880,953 | A | * | 4/1975 | Downey | 525/99 |
| 4,064,094 | A | * | 12/1977 | Downey | 524/364 |
| 4,136,071 | A | * | 1/1979 | Korpman | 524/534 |
| 4,299,929 | A | * | 11/1981 | Sakano et al. | 525/67 |
| 4,404,257 | A | * | 9/1983 | Olson | 428/412 |
| 4,824,905 | A | * | 4/1989 | Saeki et al. | 525/66 |
| 5,146,531 | A | | 9/1992 | Shustack | |
| 5,334,842 | A | * | 8/1994 | Van Havenbergh et al. | 250/483.1 |
| 5,403,658 | A | * | 4/1995 | Southwick et al. | 428/355 BL |
| 5,492,733 | A | | 2/1996 | D'Anna et al. | |
| 5,939,188 | A | | 8/1999 | Moncur et al. | |
| 6,103,370 | A | * | 8/2000 | Onozawa et al. | 428/354 |
| 6,355,345 | B1 | * | 3/2002 | Furuya et al. | 428/343 |
| 6,482,489 | B1 | * | 11/2002 | Otaki et al. | 428/40.1 |
| 6,500,883 | B1 | * | 12/2002 | Mack et al. | 523/213 |
| 2003/0104199 | A1 | * | 6/2003 | Kondo et al. | 428/343 |
| 2003/0104245 | A1 | * | 6/2003 | Bergh et al. | 428/690 |
| 2004/0208998 | A1 | | 10/2004 | Steininger et al. | |

FOREIGN PATENT DOCUMENTS

| | | | |
|---|---|---|---|
| DE | 199 20 801 | | 11/2000 |
| DE | 199 56 483 | | 6/2001 |
| DE | 100 27 268 | | 12/2001 |
| JP | 0405318671 | * | 12/1993 |
| WO | 99 26732 | | 6/1999 |

OTHER PUBLICATIONS

U.S. Appl. No. 11/067,711, filed Mar. 1, 2005, Eichner, et al.
U.S. Appl. No. 10/501,072, filed Jul. 9, 2004, Fink, et al.

* cited by examiner

*Primary Examiner* — Kevin R. Kruer

(74) *Attorney, Agent, or Firm* — Oblon, Spivak, McClelland, Maier & Neustadt, L.L.P.

(57) ABSTRACT

A multicoat system on a substrate, comprising at least one radiation-curable coating system (F) and at least one elastic intercoat (D) which is located between substrate and radiation-curable coating system (F) and has a glass transition temperature ($T_g$) of −20° C. or less.

14 Claims, No Drawings

RADIATION-CURABLE PAINT SYSTEMS HAVING A LOWER LAYER WITH LOW-TEMPERATURE ELASTICITY

This application is a national stage entry of International Application No. PCT/EP03/07709, filed Jul. 16, 2003, which in turn claims priority to German application 10233521.4 filed Jul. 23, 2002.

BACKGROUND OF THE INVENTION

1. Field of the Invention

The present invention relates to a method of improving the fracture-mechanical properties of highly scratch-resistant, radiation-curable coating systems, to coatings obtainable by said method, and the use of such coatings.

2. Description of the Background

High scratch resistance is a widespread requirement of coatings. It is met, for example, in the automobile industry by covering plastics parts with a scratch-resistant clearcoat, which may be composed on the one hand of thermosetting PU coating materials referred to as one- or two-component PU coating materials or preferably, on the other hand, of clearcoat materials which cure on exposure to actinic radiation. In the case of hard coatings, however, a problem which frequently arises is that a microcrack initiated in the coating propagates with a very high degree of local definition through the coating into the substrate to which the coating material is applied, as is described, for example, in DE-A1 199 56 483.

DE-A1 199 56 483 describes coated polymer moldings which, on a polymer layer comprising at least one graft polymer formed from a rubber-elastic graft base having a glass transition temperature, $T_g$, of below 10° C. and a graft having a $T_g$ of more than 30° C., have at least one coating-possessing certain properties. A rubber phase is therefore present distributed in the substrate.

A disadvantage of the process described is that the extent to which such graft polymers can attach covalently to the topcoat is inadequate, since grafting can take place only by way of the volume fracture of the elastomeric component of the blend. For a coating system with high fracture resistance in particular it is important to prevent small microcracks spreading through a continuous elastomer coat.

DE-A1 199 20 801 describes special multicoat clearcoat systems in which each clearcoat film is radiation-curable, one coat being made scratch-resistant by means of inorganic nanoparticles.

DE-A1 100 27 268 describes special multicoat clearcoat systems in which curing takes place in one step by means of thermal crosslinking of polyols based on acrylic copolymers with triazine crosslinker; this may occur simultaneously or successively.

WO 99/26732 describes a process for preparing a multicoat paint system in which a coating material and a clearcoat film are applied to a substrate, which may have been coated beforehand.

A disadvantage of these cited texts is that even when the technical teaching disclosed therein is employed the scratch resistance, in particular the problem of cracking within the coating, is unable to satisfy the present-day requirements.

It is an object of the invention to develop a coating which has very high scratch resistance with good adhesion to the substrate at the same time as reduced crack propagation into the substrate.

SUMMARY OF THE INVENTION

We have found that this object is achieved by a multicoat system on a substrate, comprising at least one radiation-curable coating system (F) and at least one elastic intercoat (D) which is located between substrate and radiation-curable coating system (F) and has a glass transition temperature ($T_g$) of −20° C. or less (measured in the frequency range up to −1000 Hz).

DETAILED DESCRIPTION OF THE INVENTION

Under load conditions typical of those in the utilities described, a crack which has formed in an outer coating system (F), in a multicoat system according to the invention, does not propagate through the elastic intercoat (D), with the result that the substrate to which the multicoat system has been applied is not damaged and retains its characteristic mechanical properties.

Such a multicoat system of the invention may comprise further coats. By way of example, a multicoat system of the invention is composed of the following coats, which may typically be disposed as follows:

(F) at least one radiation-curable coating system, (E) if desired, at least one coat which is pigmented and/or provided with effect substances, (D) at least one elastic intercoat (D) having a glass transition temperature ($T_g$) of −20° C. or less, (C) if desired, at least one coat selected from the group consisting of primer, basecoat, undercoat, coat pigmented or provided with effect substances, and substrate 2, (B) if desired, at least one elastic intercoat, if coat (C) is a substrate 2, and (A) substrate 1 having an impact strength to DIN EN ISO 179/1 fU at 23° C. and 50% humidity of at least 20 $kJ/m^2$.

The construction of a multicoat system of this kind is generally in the order stated, so that the substrate 1 (A) is by agreement at the bottom, the radiation-curable coating system (F) is at the top, and the elastic intercoat (D) is located in between.

Substrates 1 and/or 2 in the coats (A) and/or (C) can, for example, be wood, wood veneer, paper, paperboard, card, textile, leather, nonwoven, plastics surfaces, metals or coated metals; preference is given to paper, plastics or metals, particular preference to plastics, and very particular preference to transparent plastics.

Plastics are understood to be the engineering plastics the skilled worker knows, with impact strengths to DIN EN ISO 179/1 fU at 23° C. and 50% humidity of at least 20, preferably at least 25, $kJ/m^2$, e.g., polymers and copolymers which contain (meth)acrylic esters, vinylaromatic compounds, e.g., styrene, divinylbenzene, vinyl esters, e.g. vinyl acetate, halogenated ethylenically unsaturated compounds, e.g., vinyl chloride, vinylidene chloride, conjugated unsaturated compounds, e.g. butadiene, isoprene, chloroprene, $\alpha,\beta$-unsaturated nitriles, e.g., acrylonitrile, monounsaturated compounds, e.g., ethylene, propylene, 1-butene, 2-butene, isobutene, cyclic monounsaturated compounds, e.g., cyclopentene, cyclohexene, N-vinylpyrrolidone, N-vinyllactams, such as N-vinylcaprolactam, vinyl ethers, e.g., methyl vinyl ether, ethyl vinyl ether, n-propyl vinyl ether, iso-propyl vinyl ether, and n-butyl vinyl ether, in copolymerized form.

Mention may be made by name of polyethylene, polypropylene, polystyrene, polybutadiene, polyesters, polyamides, polyethers, polyvinyl chloride, polycarbonate, polyvinyl acetal, polyacrylonitrile, polyacetal, polyvinyl alcohol, polyvinyl acetate, phenolic resins, urea resins, melamine resins, alkyd resins, epoxy resins or polyurethanes, their block or graft copolymers and blends thereof.

Mention may be made in particular of ABS, AES, AMMA, ASA, EP, EPS, EVA, EVAL, HDPE, LDPE, MABS, MBS, MF, PA, PA6, PA66, PAN, PB, PBT, PBTP, PC, PE, PEC, PEEK, PEI, PEK, PEP, PES, PET, PETP, PF, PI, PIB, PMMA, POM, PP, PPS, PS, PSU, PUR, PVAC, PVAL, PVC, PVDC, PVP, SAN, SB, SMS, UF, UP polymers (abbreviations to DIN 7728), and aliphatic polyketones.

These plastics may preferably also have been coronaed. The substrates may optionally be pigmented or unpigmented.

Preferred substrates are polyolefins, such as PP (polypropylene), for example, which may optionally be isotactic, syndiotactic or atactic and may optionally be unoriented or have been oriented by monoaxial or biaxial stretching, SAN (styrene-acrylonitrile copolymers), PC (polycarbonates), PMMA (polymethyl methacrylates), PBT (poly(butylene terephthalate)s), PA (polyamides), ASA (acrylonitrile-styrene-acrylate copolymers) and ABS (acrylonitrile-butadiene-styrene-copolymers), and also physical mixtures thereof (blends). Particular preference is given to PP, SAN, ABS, ASA, and also blends of ABS or ASA with PA or PBT or PC.

Substrates 1 in coat (A) may also be identical substrates or different substrates laminated to one another, laminated plastics for example.

Substrates 1 and 2 in the coats (A) and (C) may be identical or different.

It is possible in each case for there to be one or more substrates 1 and/or 2 in the coats (A) and/or (C); for example, from 1 to 3, preferably from 1 to 2, and with particular preference one.

Where coat (C) comprises at least one substrate 2, said substrate may preferably be a sheet, a polymer film or metal foil for example or, with particular preference, a polymer film, which may be made from the plastics specified.

Such a sheet may have a thickness of from 1 μm to 2 mm, preferably from 5 μm to 1000 μm, with particular preference from 5 μm to 750 μm, with very particular preference from 10 μm to 500 μm, and in particular from 25 μm to 300 μm.

If coat (C) comprises a substrate 2, said substrate may sensibly be connected by a further elastic intercoat (B) to the substrate (A).

Such an intercoat has the same features as intercoat (D) (see below) and may be identical to or different from (D).

Typical thicknesses of the coat (B) range from 0.1 to 1000 μm, preferably from 0.5 to 500 μm, with particular preference from 1 to 250 μm, and with very particular preference from 1 to 100 μm.

It is possible to use one or more elastic compounds in the coat (B); for example, from 1 to 3, preferably 1 or 2, and with particular preference one.

Coat (C) may comprise, for example, at least one primer, basecoat, undercoat, coat which is pigmented or provided with effect substances, and/or, where appropriate, at least one substrate 2, which has already been described above.

Suitable color and/or effect coating materials in the coat (C) and/or (E) basically include all coating materials which are known to the skilled worker and are customary for these purposes. They may be curable physically, thermally, with actinic radiation, or both thermally and with actinic radiation (dual cure). They may comprise conventional basecoat materials, aqueous basecoat materials, substantially solvent- and water-free liquid basecoat materials (100% systems), substantially solvent- and water-free solid basecoat materials (pigmented powder coating materials) or substantially solvent-free pigmented powder coating dispersions (powder slurry basecoat materials). They may be thermally curable or dual-curable, and may be self-crosslinking or externally crosslinking.

There may be one or more, preferably from 1 to 3, with particular preference 1 or 2, and, with very particular preference, one color and/or effect coating material.

In the context of the present invention, substantially solvent-free means that the coating material in question has a residual volatile solvent content of <2.0% by weight, preferably <1.5% by weight, and with particular preference <1.0% by weight. It is especially advantageous if the residual content lies below the gas-chromatographic detection limit.

In the multicoat systems of the invention it is particularly preferred to employ aqueous basecoat materials, such as are known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 and EP 0 817 684, column 5 lines 31 to 45.

The color and/or effect coating materials described above may serve to produce not only color and/or effect basecoats but also combination effect and/or color coats. In the context of the present invention this refers to a coating which fulfils at least two functions in a multicoat color and/or effect paint system. Functions of this kind are, in particular, protection against corrosion, promotion of adhesion, the absorption of mechanical energy, and the provision of color and/or effect. In particular, the combination effect coat serves to absorb mechanical energy and to provide color and/or effect at the same time; that is it fulfills the functions of a surfacer coat or antistonechip primer coat and of a basecoat. Preferably, the combination effect coat also has corrosion protection and/or adhesion promotion effects.

Typical thicknesses of the coat (C) and/or (E) range from 0.1 to 2000 μm, preferably 0.5 to 1000 μm, with particular preference from 1 to 500 μm, with very particular preference from 1 to 250 μm, and in particular from 10 to 100 μm.

The coating materials which can be used in the multicoat systems of the invention may comprise color and/or effect pigments. Suitable color pigments include all customary coatings pigments of organic or inorganic type. Examples of organic and inorganic color pigments are titanium dioxide, micronized titanium dioxide, iron oxide pigments, carbon black, azo pigments, phthalocyanine pigments, quinacridone pigments, and pyrrolopyrrole pigments.

The effect pigments are notable in particular for a platelet-like structure. Examples of effect pigments include: metal pigments, e.g., of aluminum, copper or other metals; interference pigments, such as metal pigments coated with metal oxide, e.g., titanium dioxide-coated or mixed oxide-coated aluminum, coated mica, such as titanium dioxide-coated mica, and graphite effect pigments. For the purpose of improving the hardness, for example, an advantageous possibility is to use UV-curable pigments and, where appropriate, fillers as well. These are radiation-curable compounds, examples being acryloyl-functional silanes, and coated pigments/fillers, which as a result can be included in the radiation cure operation.

In accordance with the invention the intercoat (D) comprises at least one compound having a glass transition temperature ($T_g$) of in each case −20° C. or less, preferably −30°

C. or less, with particular preference −40° C. or less, with very particular preference −50° C. or less, and in particular −60° C. or less.

The glass transition temperature, Tg, was determined using flexural vibration tests (to DIN 53440 Parts 1 to 3) at a frequency of from 0 to 1000 Hz, preferably from 100 to 1000 Hz. The flexural vibration yields the Tg that is important from a fracture-mechanical standpoint at high deformation rates (frequencies).

The thickness ZS of the intercoat (D) present in accordance with the invention in the multicoat system can be, for example, from 0.1 to 1000 μm, preferably from 0.5 to 500 μm, with particular preference from 1 to 250 μm, with very particular preference from is 5 to 50 μm, and in particular from 10 to 50 μm.

Examples of compounds which can be used in the elastic intercoat are rubber-containing polymers, ac-Resins, polyacrylates having a $T_g$ as specified, and poly-iso-butylenes.

Suitable rubber-containing polymers include, for example, thermoplastic elastomers. Such thermoplastic elastomers generally contain at least one elastomeric component (soft domains) and at least one thermoplastic component (hard domains), which may be connected to one another in the form of a blend, vulcanizate or block polymer, preferably as a block polymer.

The elastomeric component may comprise styrene-butadiene (SBR), polyisoprene (IR), polybutadiene (BR), chloroprene (CR) acrylonitrile-butadiene (NBR), butyl (isobutene/isoprene copolymer, IIR), butyl/α-methylstyrene terpolymer, ethylene/propylene (EPM), ethylene/propylene/diene (EPDM), epichlorohydrin (CO), epichlorohydrin/ethylene oxide (ECO) or ethylene/vinyl acetate rubber (EVA/EVM), preferably polybutadiene, polyisoprene, ethylene/propylene or ethylene/propylene/diene rubber, with particular preference polybutadiene rubber or polyisoprene rubber, and with very particular preference polybutadiene rubber.

The elastomeric component generally has molar masses (in a block polymer based on the block) of at least 80 000 g/mol, preferably at least 100 000 g/mol, with particular preference from 100 000 to 250 000, and with very particular preference from 120 000 to 230 000 g/mol.

The thermoplastic component may comprise, for example, polypropylene, preferably isotactic polypropylene, a random or block copolymer of propylene and ethylene, HDPE, LDPE, LLDPE, EVA, ethylene/methacrylate copolymers, ethylene/ethyl acrylate copolymers, SAN, ABS, ASA, PMMA or polystyrene; preference is given to polystyrene and polypropylene and particular preference to polystyrene.

The thermoplastic component generally has molar masses (in a block polymer based on the block) of up to 50 000 g/mol, preferably from 5000 to 40 000 g/mol and with particular preference from 6000 to 20 000 g/mol.

As a proportion of the overall thermoplastic elastomer the fraction of the thermoplastic component is generally up to 50% by weight, preferably up to 40% by weight, and with particular preference up to 35% by weight. The minimum amount of thermoplastic component is generally at least 8% by weight, preferably at least 20% by weight, and with particular preference at least 25% by weight.

Preferred thermoplastic elastomers are those having at least one elastomeric block Y and at least one thermoplastic block Z, of the general formula $Z(\text{-}Y\text{-}Z)_m$, in which m is a positive integer from 1 to 10, preferably from 1 to 5, with particular preference from 1 to 3, with very particular preference 1 or 2, and in particular 1. In the latter case the polymers are referred to as triblock polymers. The polymers may, for example, be of linear or branched construction, such as star-shaped, for example, but are preferably linear.

Particularly preferred thermoplastic elastomers are styrene oligoblock polymers; very particular preference is given to styrene triblock polymers in which the thermoplastic block is composed predominantly, preferably completely, of styrene. Especial preference is given to styrene-butadiene-styrene (SBS), styrene-isoprene-styrene (SIS), styrene-ethylene/butylene-styrene (SEBS), and styrene-ethylene/propylene-styrene (SEPS) block polymers, with or without further functionalization with reactive comonomers such as maleic anhydride, for example. The thermoplastic elastomers may also have been fully or partly hydrogenated.

The thermoplastic elastomers which can be used in accordance with the invention may further include a diblock fraction $(Z\text{-}Y\text{-})_m$, which may amount to preferably up to 50% by weight, with particular preference up to 40% by weight, with very particular preference up to 30% by weight, and in particular up to 20% by weight.

Moreover, the thermoplastic elastomers which can be used in accordance with the invention may be admixed with mineral oil, polystyrene, polyolefins, fillers or additives, such as antioxidants, UV stabilizers or antiozonants.

Suitable with very particular preference as thermoplastic elastomers are the Kraton® grades from Kraton Polymers U.S. LLC, Houston, Tex., USA and Vector® grades from Dexco Polymer, Houston, Tex., USA. Particular preference is given to the Kraton D and G grades, preferably the Kraton D grades, and with particular preference Kraton D1101, D1118, D4150, D1112, D-KS 225 ES, D1102, D1116, D1186, and D4123, and also to the Vector grades 7400, 8508, and 2518.

Suitable polyacrylates are (co)polymers havng a $T_g$ as specified.

These (co)polymers generally have the following composition:

principal monomer 50-98% by weight
secondary monomer 10-40% by weight
functionalized monomer 0-20% by weight,
with the proviso that the sum is always 100% by weight.

Examples of principal monomers therein are (meth)acrylic acid methyl ester, (meth)acrylic acid ethyl ester, (meth)acrylic acid n-propyl ester, (meth)acrylic acid n-butyl ester, (meth)acrylic acid iso-butyl ester, (meth)acrylic acid sec-butyl ester, (meth)acrylic acid n-pentyl ester, (meth)acrylic acid iso-pentyl ester, (meth)acrylic acid 2-methylbutyl ester, (meth)acrylic acid amyl ester, (meth)acrylic acid n-hexyl ester, (meth)acrylic acid 2-ethylbutyl ester, (meth)acrylic acid pentyl ester, (meth)acrylic acid n-heptyl ester, (meth)acrylic acid n-octyl ester, (meth)acrylic acid 2-ethylhexyl ester, (meth)acrylic acid n-decyl ester, (meth)acrylic acid undecyl ester, (meth)acrylic acid n-dodecyl ester, (meth)acrylic acid 2-methoxyethyl ester, (meth)acrylic acid 2-ethoxyethyl ester, (meth)acrylic acid 4-methoxybutyl ester, (meth)acrylic acid 2-(2'-methoxyethoxy)ethyl ester, (meth)acrylic acid 2-hydroxyethyl ester, (meth)acrylic acid 2-hydroxypropyl ester, (meth)acrylic acid 3-hydroxypropyl ester, (meth)acrylic acid 4-hydroxybutyl ester, ethylene glycol (meth)acrylate, propylene glycol (meth)acrylate, 1,6-hexanediol di(meth)acrylate, 1,2-ethylene glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri (meth)acrylate, pentaerythritol tri(meth)acrylate and tetra (meth)acrylate, vinyl chloride, vinylidene chloride, vinyl acetate, vinyl propionate, vinyl butyrate, methyl vinyl ketone, vinyltoluene, vinylnaphthalene, methyl vinyl ether, ethyl vinyl ether, n-propyl vinyl ether, iso-propyl vinyl ether, n-butyl vinyl ether, sec-butyl vinyl ether, iso-butyl vinyl ether, tert-butyl vinyl ether, 4-hydroxybutyl vinyl ether, n-octyl vinyl ether, ethylene, propylene, 1-butene, 2-butene, isobutene, cyclopentene, cyclohexene, cyclododecene, butadiene, isoprene, chloroprene, styrene, α-methylstyrene, divinylbenzene, tert-butylstyrene and mixtures thereof.

Examples of suitable secondary monomers are (meth)acrylic acid iso-bornyl ester, (meth)acrylic acid tridecyl ester, (meth)acrylic acid lauryl ester, (meth)acrylic acid stearyl ester, (meth)acrylic acid 10-cyclohexylundecyl ester, (meth)acrylic acid 2-cyanoethyl ester, (meth)acrylic acid 2-dimethylaminoethyl ester, (meth)acrylic acid glycidyl ester, (meth)acrylic acid 3-(trimethoxysilyl)propyl ester, (meth)acrylic acid 2-(trimethoxysilyl)ethyl ester, N-(2-hydroxyethyl)(meth)acrylamide, N,N-dimethyl(meth)acrylamide, N-tert-butyl(meth)acrylamide, N-octyl(meth)acrylamide, acrolein, (meth)acrylonitrile, diisopropyl fumarate, di-n-butyl fumarate, di-sec-butyl fumarate, diamyl fumarate, di-2-ethylbutyl fumarate, di-n-octyl fumarate, di-2-ethylhexyl fumarate, didodecyl fumarate, bis(2-hydroxyethyl) fumarate, dibutyl maleate, di-2-ethylhexyl maleate, di(2-hydroxyethyl) maleate, maleic mononitrile, maleic dinitrile, vinyl valerate, divinyl ether, 2-chloroethyl vinyl ether, α-propiolactone, δ-valerolactone, ϵ-caprolactone, N-vinylformamide, N-vinylacetamide, N-vinyl-N-methylformamide, N-vinyl-N-methylacetamide, allylacetic acid, vinyl acetic acid, and mixtures thereof.

Functionalized monomers are, for example, those which carry carboxyl, hydroxyl, epoxy, allyl, carboxamido, amine, isocyanato, hydroxymethyl, methoxymethyl or silyloxy groups. They may be, for example, (meth)acrylic acid, (meth) acrylic acid formal, (meth)acrylic acid hydroxymethyl ester, (meth)acrylic acid benzophenoneglycidyl ester, (meth) acrylic acid 2-sulfoethyl ester, (meth)acrylamide, N-methylol(meth)acrylamide, fumaric acid, mono-iso-propyl fumarate, mono-n-hexyl fumarate, fumaric amide, fumaric diamide, fumaric mononitrile, fumaric dinitrile, crotonic acid, glycidyl crotonate, itaconic acid, itaconic monoesters, itaconic anhydride, citraconic acid, citraconic monoesters, citraconic anhydride, succinic acid, maleic acid, monomethyl maleate, monoethyl maleate, monobutyl maleate, maleic anhydride, maleic monoamide, maleic diamide, N-methylolmaleamide, vinylsuccinimide, vinylimidazole, 2-vinylpyridine, 4-vinylpyridine, N-vinylpyrrolidone, N-vinylpiperidone, N-vinylcaprolactam, sodium vinylsulfonate, tetraallyloxyethane, diallyl phthalate, diallyl succinate, tetraallylethane, tetraallyloxysilane, allyl glycidyl ether, triallyl cyanurate, triallyl isocyanurate, diketene, monoethylenically unsaturated carboxylic acids having from 3 to 8 carbon atoms, and their water-soluble alkali metal salts, alkaline earth metal salts or ammonium salts, such as, for example: acrylic acid, methacrylic acid, dimethylacrylic acid, ethacrylic acid, maleic acid, citraconic acid, methylenemalonic acid, crotonic acid, fumaric acid, mesaconic acid or itaconic acid, and mixtures thereof.

In order to give the specified $T_g$, these polymers generally contain a high fraction of n-butyl acrylate or 2-ethylhexyl acrylate, preferably at least 50% by weight.

The weight-average molar weight of the (co)polymers which can be used, where appropriate prior to further crosslinking, as determined by gel permeation chromatography using polystyrene as standard and tetrahydrofuran as mobile phase, is situated, for example, between 200 000 and 1 500 000 g/mol, preferably between 250 000 and 1 200 000, with particular preference between 300 000 and 900 000.

The gel content of the (co)polymers which can be used, i.e., the soluble fraction of an adhesive film stored at room temperature under THF for 24 hours, is between 30 and 70%, preferably between 30 and 60%, and with particular preference between 40 and 60% by weight.

Particularly suitable in accordance with the invention are radiation-crosslinkable polyacrylates.

These are polyacrylates which can be crosslinked by active irradiation of energy. These adhesives generally contain poly (meth)acrylate, preferably polyacrylate, where appropriate in combination with aliphatic or aromatic epoxy resins, urethanes, polyesters or polyethers. It is preferred to use epoxy resins or aliphatic, aromatic or mixed aliphatic-aromatic urethanes.

Crosslinking takes place by active irradiation of energy, but may also involve a second curing mechanism or further curing mechanisms (dual cure) by means, for example, of moisture, oxidation or thermal exposure, preferably by means of heat, e.g., at the specified curing temperature.

It is also possible to include crosslinking monomers, examples being 1,3-butylene glycol di(meth)acrylate, tripropylene glycol di(meth)acrylate, trimethylolpropane triacrylate, and pentaerythritol tetraacrylate.

For crosslinking by UV light it is possible to add a photoinitiator.

Alternatively, the photoinitiator may also have been attached to the poly(meth)acrylate. In that case the photoinitiator may comprise, for example, cyclic imide structures, e.g. maleimide or maleimide derivatives, benzophenone or acetophenone groups. The latter are described, for example, in EP-B1 377 199, page 3 line 14 to page 13 line 45, and in EP-A 395 987, page 3 line 24 to page 5 line 42, and are hereby incorporated by reference.

Particularly suitable are the UV acrylates acResin® A 203 UV and acResin® A 258 UV from BASF AG, Ludwigshafen, Germany.

As poly-iso-butenes (PIBs) or modified poly-iso-butenes, examples being the reaction products of PIB with maleic anhydride, hydroformylated PIBs, hydroformylated and subsequently hydrogenated PIBs, and also hydroformylated and subsequently reductively aminated PIBs, suitable products include Glissopal® or Oppanol® grades from BASF AG, Polybutene® grades from BP, the Infineum® C series from Infineum Int. Ltd., Lubrizol® LZ grades from Lubrizol, Vistanex® grades from ExxonMobil Chemical Corp., Tetrox® grades from Nippon Petrochemicals and Efrolen® grades from Efrimov, which have a molar weight of from about 200 to 1 000 000, preferably the Oppanols® B10, B10N, B10SFN, B100, B100G, B12N, B12SF, B12SFN, B15, B15 BULK, B15N, B15SF, B15SFN, B150, B150G, B200, B200G, B246, B250, B30SF, B50, B50SF, B80, NTK and NTS, and also the Glissopals® 1300, 2300, 550, 750, ES 3252, M 1600, OS, SA, V 1500, V 220, V 230, V33, V 500, V640, V700, V90 and 1000, Infineum® C9945, C9925, C9950, C9970, C9980, C9983, C9984, C9913, C9922, C9907, C9924 and C9995, and also Vistanex® L-80, L-100, L-120, L-140, LM-MS, LM-MH, LM-MS-LC, LM-MH-LC, and LM-H-LC.

It is of course also possible to use a mixture of different compounds having a glass transition temperature of −20° C. or less; for example, from 1 to 5, preferably from 1 to 4, with particular preference from 1 to 3, and with very particular preference 1 or 2 compounds. In particular, one compound is used.

The radiation-curable compositions which can be used in accordance with the invention in radiation-curable coating systems (F) are known per se and are not restricted; it is possible here, for example, for them to be the radiation-curable clearcoat materials or topcoat materials which are known for such purposes to the skilled worker. They generally contain at least one free-radically and/or cationically polymerizable group; preferably, they can be polymerized free-radically.

Polymerizable groups can be groups which contain unsaturated bonds, preferably carbon-carbon double bonds.

Examples of free-radically polymerizable groups include isolated ethylenically unsaturated groups, conjugated unsaturated groups, vinylaromatic groups, vinyl chloride and vinylidene chloride groups, N-vinyl amides, vinylpyrrolidones, vinyllactams, vinyl esters, (meth)acrylic esters, and acrylonitriles.

Examples of cationically polymerizable groups include isobutylene units or vinyl ethers.

The preferred radiation-curable compositions include as their polymerizable groups preferably acrylate, methacrylate or vinyl ether functions.

A radiation-curable composition which can be used in accordance with the invention customarily comprises (F1) at least one polymerizable compound containing two or more copolymerizable, ethylenically unsaturated groups, (F2) if desired, reactive diluents, (F3) if desired, photoinitiator and (F4) if desired, further, typical coatings additives.

Suitable compounds (F1) include radiation-curable, free-radically polymerizable compounds containing two or more, i.e., at least two, copolymerizable, ethylenically unsaturated groups.

Compounds (F1) are preferably vinyl ether or (meth)acrylate compounds, with particular preference being given in each case to the acrylate compounds, i.e., the derivatives of acrylic acid.

Preferred vinyl ether and (meth)acrylate compounds (F1) contain from 2 to 20, preferably from 2 to 10, and with very particular preference from 2 to 6 copolymerizable, ethylenically unsaturated double bonds.

Particular preference is given to compounds (F1) having an ethylenically unsaturated double bond content of 0.1-0.7 mol/100 g, with very particular preference 0.2-0.6 mol/100 g.

Unless stated otherwise, the number-average molecular weight $M_n$ of the compounds (F1) is preferably below 15 000, with particular preference 300-12 000, with very particular preference 400-5000, and in particular 500-3000 g/mol (as determined by gel permeation chromatography using polystyrene as standard and tetrahydrofuran as mobile phase).

(Meth)acrylate compounds that may be mentioned include (meth)acrylic esters and especially acrylic esters and vinyl ethers of polyfunctional alcohols, especially those which beside the hydroxyl-groups contain no further functional groups or only ether groups. Examples of such alcohols include difunctional alcohols, such as ethylene glycol, propylene glycol, and their counterparts with higher degrees of condensation, such as diethylene glycol, triethylene glycol, dipropylene glycol, tripropylene glycol, etc., 1,2-, 1,3- or 1,4-butanediol, 1,5-pentanediol, 1,6-hexanediol, 3-methyl-1,5-pentanediol, neopentyl glycol, alkoxylated phenolic compounds, such as ethoxylated and/or propoxylated bisphenols, 1,2-, 1,3- or 1,4-cyclohexanedimethanol, alcohols with a functionality of three or more, such as glycerol, trimethylolpropane, butanetriol, trimethylolethane, pentaerythritol, ditrimethylolpropane, dipentaerythritol, sorbitol, mannitol, and the corresponding alkoxylated, especially ethoxylated and/or propoxylated, alcohols.

The alkoxylation products are obtainable conventionally by reacting the above alcohols with alkylene oxides, especially ethylene oxide or propylene oxide. The degree of alkoxylation per hydroxyl group is preferably from 0 to 10; that is, 1 mol of hydroxyl group may have been alkoxylated with up to 10 mol of alkylene oxides.

(Meth)acrylate compounds that may be mentioned further include polyester (meth)acrylates, which are the (meth)acrylic esters or vinyl ethers of polyesterols.

Examples of suitable polyesterols include those which can be prepared by esterifying polycarboxylic acids, preferably dicarboxylic acids, with polyols, preferably diols. Starting materials for such hydroxyl-containing polyesters are known to the skilled worker. Dicarboxylic acids which can be used preferably include succinic acid, glutaric acid, adipic acid, sebacic acid, o-phthalic acid, tetrahydrophthalic acid, terephthalic acid, their isomers and hydrogenation products, and esterifiable derivatives, such as anhydrides or dialkyl esters of said acids. Suitable polyols include the abovementioned alcohols, preferably ethylene glycol, propylene 1,2-glycol and 1,3-glycol, butane-1,4-diol, hexane-1,6-diol, neopentyl glycol, cyclohexanedimethanol, 2,2-bis(4-hydroxycyclohexyl)propane, and polyglycols of the ethylene glycol and propylene glycol type.

Examples of suitable radiation-curable compounds (F1) also include unsaturated polyester resins, which consist essentially of polyols, especially diols, and polycarboxylic acids, especially dicarboxylic acids, one of the esterification components containing a copolymerizable, ethylenically unsaturated group. Said component is for example maleic acid, fumaric acid or maleic anhydride.

Polyester (meth)acrylates can be prepared in a plurality of stages or else in one stage, as described in EP-A 279 303 for example, from (meth)acrylic acid, polycarboxylic acid, and polyol.

Additionally, compounds (F1) may comprise, for example, urethane or epoxy (meth)acrylates or urethane or epoxy vinyl ethers.

Urethane (meth)acrylates, for example, are obtainable by reacting polyisocyanates with hydroxyalkyl (meth)acrylates or hydroxylalkyl vinyl ethers and, where appropriate, chain extenders such as diols, polyols, diamines, polyamines or dithiols or polythiols. Urethane (meth)acrylates which can be dispersed in water without adding emulsifiers further contain ionic and/or nonionic hydrophilic groups, which are introduced into the urethane by means, for example, of synthesis components such as hydroxy carboxylic acids.

The polyurethanes which can be used in accordance with the invention as binders (F1) include as synthesis components substantially:

(F1-a) at least one organic aliphatic, aromatic or cycloaliphatic di- or polyisocyanate, (F1-b) at least one compound containing at least one isocyanate-reactive group and at least one free-radically polymerizable unsaturated group, and (F1-c) if desired, at least one compound containing at least two isocyanate-reactive groups.

Examples of suitable components (F1-a) include aliphatic, aromatic, and cycloaliphatic di- and polyisocyanates having an NCO functionality of at least 1.8, preferably from 1.8 to 5, and with particular preference from 2 to 4, and also their isocyanurates, biurets, allophanates, and uretdiones.

The diisocyanates are preferably isocyanates having from 4 to 20 carbon atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene-diisocyanate, derivatives of lysine diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and aromatic diisocyanates such as 2,4- or 2,6-tolylene diisocyanate and isomer mixtures thereof, m- or p-xylylene diisocyanate, 2,4'- or 4,4'-diisocyanatodiphenylmethane and isomer mixtures thereof, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methylbiphenylmethane 4,4'-diisocyanate, tetramethylxylylene diisocyanate, 1,4-diisocyanatobenzene or diphenyl ether 4,4'-diisocyanate.

It is also possible for mixtures of said diisocyanates to be present.

Preference is given to hexamethylene diisocyanate, 1,3-bis(isocyanatomethyl)cyclohexane, isophorone diisocyanate, and di(isocyanatocyclohexyl)methane.

Suitable polyisocyanates include polyisocyanates containing isocyanurate groups, uretdione diisocyanates, polyisocyanates containing biuret groups, polyisocyanates containing urethane or allophanate groups, polyisocyanates containing oxadiazinetrione groups, uretoneimine-modified polyisocyanates from linear or branched $C_4$-$C_{20}$ alkylene diisocyanates, cycloaliphatic diisocyanates having a total of from 6 to 20 carbon atoms or aromatic diisocyanates having a total of from 8 to 20 carbon atoms, or mixtures thereof.

The di- and polyisocyanates which can be used preferably have an isocyanate group content (calculated as NCO, molecular weight=42) of from 10 to 60% by weight, based on the di- and polyisocyanate (mixture), more preferably from 15 to 60% by weight, and with particular preference from 20 to 55% by weight.

Preference is given to aliphatic and cycloaliphatic di- and polyisocyanates, e.g., the aliphatic and cycloaliphatic diisocyanates mentioned above, or mixtures thereof.

Further preferred are

1) Polyisocyanates containing isocyanurate groups, from aromatic, aliphatic and/or cycloaliphatic diisocyanates. Particular preference is given here to the corresponding aliphatic and/or cycloaliphatic isocyanato-isocyanurates and especially to those based on hexamethylene diisocyanate and isophorone diisocyanate. The present isocyanurates are, in particular, trisisocyanatoalkyl or trisisocyanatocycloalkyl isocyanurates, which are cyclic trimers of the diisocyanates, or mixtures with their higher homologs containing more than one isocyanurate ring. The isocyanato-isocyanurates generally have an NCO content of from 10 to 30% by weight, in particular from 15 to 25% by weight, and an average NCO functionality of from 3 to 4.5.
2) Uretdione diisocyanates containing aromatically, aliphatically and/or cycloaliphatically attached isocyanate groups, preferably aliphatically and/or cycloaliphatically attached groups, and especially those derived from hexamethylene diisocyanate or isophorone diisocyanate. Uretdione diisocyanates are cyclic dimerization products of diisocyanates. In the formulations of the invention the uretdione diisocyanates can be used as a sole component or in a mixture with other polyisocyanates, especially those specified under 1).
3) Polyisocyanates containing biuret groups and aromatically, cycloaliphatically or aliphatically attached, preferably cycloaliphatically or aliphatically attached, isocyanate groups, especially tris(6-isocyanatohexyl)biuret or its mixtures with its higher homologs. These biuret-containing polyisocyanates generally have an NCO content of from 18 to 22% by weight and an average NCO functionality of from 3 to 4.5.
4) Polyisocyanates containing urethane and/or allophanate groups and aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with polyhydric alcohols such as trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane or mixtures thereof, for example. These polyisocyanates containing urethanes and/or allophanate groups generally have an NCO content of from 12 to 20% by weight and an average NCO functionality of from 2.5 to 3.
5) Polyisocyanates containing oxadiazinetrione groups, preferably derived from hexamethylene diisocyanate or isophorone diisocyanate. Polyisocyanates of this kind containing oxadiazinetrione groups can be prepared from diisocyanate and carbon dioxide.
6) Uretoneimine-modified polyisocyanates.

The polyisocyanates 1) to 6) can be used in a mixture, including where appropriate a mixture with diisocyanates.

Suitable components (F1-b) include compounds which carry at least one isocyanate-reactive group and at least one free-radically polymerizable group.

Examples of possible isocyanate-reactive groups include —OH, —SH, —$NH_2$, and —$NHR^1$, where $R^1$ is hydrogen or an alkyl group containing from 1 to 4 carbon atoms, such as methyl, ethyl, n-propyl, iso-propyl, n-butyl, iso-butyl, sec-butyl or tert-butyl.

Components (F1-b) can be, for example, monoesters of α,β-unsaturated carboxylic acids, such as acrylic acid, methacrylic acid, crotonic acid, itaconic acid, fumaric acid, maleic acid, acrylamidoglycolic acid, methacrylamidoglycolic acid or vinyl ethers with diols or polyols which preferably have from 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, poly-THF having a molar weight of between 162 and 2000, poly-1,3-propanediol having a molar weight of between 134 and 400 or polyethylene glycol having a molar weight of between 238 and 458. Moreover, it is also possible to use esters or amides of (meth)acrylic acid with amino alcohols, e.g., 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid.

Also suitable, furthermore, are unsaturated polyetherols or polyesterols or polyacrylatepolyols having an average OH functionality of from 2 to 10.

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide, 5-hydroxy-3-oxapentyl (meth)acrylamide, N-hydroxyalkylcrotonamides such as N-hydroxymethylcrotonamide or N-hydroxyalkylmaleimides such as N-hydroxyethylmaleimide.

Preference is given to using 2-hydroxyethyl(meth)acrylate, 2- or 3-hydroxypropyl(meth)acrylate, 1,4-butanediol mono(meth)acrylate, neopentyl glycol mono(meth)acrylate, 1,5-pentanediol mono(meth)acrylate, 1,6-hexanediol mono (meth)acrylate, glycerol mono- and di(meth)acrylate, trimethylolpropane mono- and di(meth)acrylate, pentaerythritol mono-, di- and tri(meth)acrylate, and also 4-hydroxybutyl vinyl ether, 2-aminoethyl (meth)acrylate, 2-aminopropyl (meth)acrylate, 3-aminopropyl (meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl(meth)acrylamide, 2-hydroxyethyl(meth)acrylamide, 2-hydroxypropyl(meth) acrylamide or 3-hydroxypropyl(meth)acrylamide. Particular preference is given to 2-hydroxyethyl acrylate, 2-hydroxyethyl methacrylate, 2- or 3-hydroxypropyl acrylate, 1,4-butanediol monoacrylate, and 3-(acryloyloxy)-2-hydroxypropyl methacrylate.

Suitable components (F1-c) include compounds which carry at least two isocyanate-reactive groups, examples being —OH, —SH, —$NH_2$, and —$NHR^2$, in which $R^2$ can be, independently at each occurrence, hydrogen, methyl, ethyl, iso-propyl, n-propyl, n-butyl, iso-butyl, sec-butyl or tert-butyl.

These compounds are preferably diols or polyols, such as hydrocarbon diols containing from 2 to 20 carbon atoms, e.g., ethylene glycol, 1,2-propanediol, 1,3-propanediol, 1,1-dimethylethane-1,2-diol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, etc., esters thereof with short-chain dicarboxylic acids, such as adipic acid, cyclohexanedicarboxylic acid, their carbonates, prepared by reacting the diols with phosgene or by transesterification with dialkyl or diaryl carbonates, or aliphatic diamines, such as methylene- and isopropylidene-bis(cyclohexylamine), piperazine, 1,2-, 1,3- or 1,4-diaminocyclohexane, 1,2-, 1,3- or 1,4-cyclohexanebis(methylamine), etc., dithiols or polyfunctional alcohols, secondary or primary amino alcohols, such as ethanolamine, diethanolamine, monopropanolamine, dipropanolamine, etc. or thio alcohols, such as thioethylene glycol.

Further possibilities include diethylene glycol, triethylene glycol, dipropylene glycol, tripropylene glycol, neopentyl glycol, pentaerythritol, 1,2- and 1,4-butanediol, 1,5-pentanediol, 2-methyl-1,5-pentanediol, 2-ethyl-1,4-butanediol, 1,2-, 1,3-, and 1,4-dimethylolcyclohexane, 2,2-bis(4-hydroxycyclohexyl)propane, glycerol, trimethylolethane, trimethylolpropane, trimethylolbutane, dipentaerythritol, ditrimethylolpropane, erythritol, and sorbitol, 2-aminoethanol, 3-amino-1-propanol, 1-amino-2-propanol or 2-(2-aminoethoxy)ethanol, bisphenol A, or butanetriol.

Also suitable, furthermore, are unsaturated polyetherols or polyesterols or polyacrylatepolyols having an average OH functionality of from 2 to 10, and also polyamines, such as polyethyleneimine or polymers of, for example, poly-N-vinylformamide which contain free amine groups.

Particularly suitable here are the cycloaliphatic diols, such as bis(4-hydroxycyclohexane)isopropylidene, tetramethylcyclobutanediol, 1,2-, 1,3- or 1,4-cyclohexanediol, cyclooctanediol or norbornanediol, for example.

The polyurethanes which can be used in accordance with the invention are obtained by reacting components (F1-a), (F1-b) and (F1-c) with one another.

In this reaction the molar composition (F1-a):(F1-b):(F1-c) per 3 mol of reactive isocyanate groups in (F1-a) is generally as follows:

(F1-b) 1.5-3.0, preferably 2.0-2.9, with particular preference 2.0-2.5, and in particular 2.0-2.3 mol of is isocyanate-reactive groups and (F1-c) 0-1.5, preferably 0.1-1.0, with particular preference 0.5-1.0 and in particular 0.7-1.0 mol of isocyanate-reactive groups.

When the polyurethanes are used in aqueous systems, it is preferable for substantially all of the isocyanate groups present to have been reacted.

The formation of the adduct of isocyanate-functional compound and the compound containing isocyanate-reactive groups takes place generally by mixing of the components in any desired sequence, where appropriate at an elevated temperature.

In this mixing operation, the compound containing isocyanate-reactive groups is preferably added to the compound containing isocyanate groups, more preferably in two or more steps.

With particular preference, the compound containing isocyanate groups is introduced initially and the compounds containing isocyanate-reactive groups are added. In particular, the isocyanate-functional compound (F1-a) is introduced initially and then (F1-b) is added. After that, where appropriate, further desired components can be added.

The reaction is generally conducted at temperatures between 5 and 100° C., preferably between 20 and 90° C., and with particular preference between 40 and 80° C., and in particular between 60 and 80° C.

It is preferred to operate under water-free conditions.

Water-free means that the amount of water in the reaction system is not more than 5% by weight, preferably not more than 3% by weight, and with particular preference not more than 1% by weight.

The reaction is preferably conducted in the presence of at least one suitable inert gas, examples being nitrogen, argon, helium, carbon dioxide or the like.

The reaction may also be conducted in the presence of an inert solvent, such as acetone, iso-butyl methyl ketone, toluene, xylene, butyl acetate or ethoxyethyl acetate, but is preferably conducted in the absence of a solvent.

The urethane (meth)acrylates preferably have a number-average molar weight $M_n$ of from 500 to 20 000, in particular from 750 to 10 000, and with particular preference from 750 to 3000 g/mol (as determined by gel permeation chromatography using tetrahydrofuran and polystyrene as standard).

The urethane (meth)acrylates preferably contain from 1 to 5 mol, with particular preference from 2 to 4 mol, of (meth) acrylic groups per 1000 g of urethane (meth)acrylate.

The urethane vinyl ethers preferably contain from 1 to 5 mol, with particular preference from 2 to 4 mol, of vinyl ether groups per 1000 g of urethane vinyl ether.

Epoxy (meth)acrylates are obtainable by reacting epoxides with (meth)acrylic acid. Examples of suitable epoxides include epoxidized olefins, aromatic glycidyl ethers, and aliphatic glycidyl ethers, preferably those of aromatic or aliphatic glycidyl ethers.

Examples of possible epoxidized olefins include ethylene oxide, propylene oxide, iso-butylene oxide, 1-butene oxide, 2-butene oxide, vinyloxirane, styrene oxide or epichlorohydrin; preference is given to ethylene oxide, propylene oxide, iso-butylene oxide, vinyloxirane, styrene oxide or epichlorohydrin, particular preference to ethylene oxide, propylene oxide or epichlorohydrin, and very particular preference to ethylene oxide and epichlorohydrin.

Examples of aromatic glycidyl ethers include bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g. 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]) and cresol-based epoxy novolaks (CAS No. [37382-79-9]).

Aliphatic glycidyl ethers are, for example, 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ethers of polypropylene glycol (α,ω)-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy (meth)acrylates and epoxy vinyl ethers preferably have a number-average molar weight $M_n$ of from 340 to 20 000, with particular preference from 500 to 10 000 g/mol, and with very particular preference from 750 to 3000 g/mol; the amount of (meth)acrylic groups or vinyl ether groups is preferably from 1 to 5, with particular preference from 2 to 4, per 1000 g of epoxy (meth)acrylate or vinyl ether epoxide (as determined by gel permeation chromatography using polystyrene as standard and tetrahydrofuran as mobile phase).

Radiation-curable compounds (F1) which are further suitable include carbonate (meth)acrylates, containing on average preferably from 1 to 5, in particular from 2 to 4, with particular preference from 2 to 3, and with very particular preference 2 (meth)acrylic groups.

The number-average molecular weight $M_n$ of the carbonate (meth)acrylates is preferably less than 3000 g/mol, with particular preference less than 1500 g/mol, with very particular preference less than 800 g/mol (as determined by gel permeation chromatography using polystyrene as standard and tetrahydrofuran as solvent).

The carbonate (meth)acrylates are obtainable in a simple way by transesterification of carbonic esters with polyhydric, preferably dihydric, alcohols (diols, e.g. hexanediol) and subsequent esterification of the free OH groups with (meth) acrylic acid or else transesterification with (meth)acrylic esters, as described for example in EP-A 92 269. They can also be obtained by reacting phosgene, urea derivatives with polyhydric, e.g., dihydric, alcohols.

In an analogous way, vinyl ether carbonates are also obtainable by reacting a hydroxyalkyl vinyl ether with carbonic esters and also, if desired, dihydric alcohols.

Also possible are (meth)acrylates or vinyl ethers of polycarbonatepolyols, such as the reaction product of one of the diols or polyols mentioned and a carbonic ester and also a hydroxyl-containing (meth)acrylate or vinyl ether.

Examples of suitable carbonic esters are ethylene carbonate, 1,2- or 1,3-propylene carbonate, dimethyl, diethyl or dibutyl carbonate.

Examples of suitable hydroxy-containing (meth)acrylates are 2-hydroxyethyl (meth)acrylate, 2- or 3-hydroxypropyl (meth)acrylate, 1,4-butanediol mono(meth)acrylate, neopentyl glycol mono(meth)acrylate, glycerol mono- and di(meth) acrylate, trimethylolpropane mono- and di(meth)acrylate, and pentaerythritol mono-, di- and tri(meth)acrylate.

Examples of suitable hydroxy-containing vinyl ethers are 2-hydroxyethyl vinyl ether and 4-hydroxybutyl vinyl ether.

Particularly preferred carbonate (meth)acrylates are those of the formula:

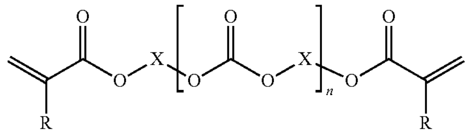

where R is H or $CH_3$, X is a $C_2$-$C_{18}$ alkylene group, and n is an integer from 1 to 5, preferably from 1 to 3.

R is preferably H and X is preferably $C_2$ to $C_{10}$ alkylene, such as 1,2-ethylene, 1,2-propylene, 1,3-propylene, 1,4-butylene or 1,6-hexylene, with particular preference $C_4$ to $C_8$ alkylene. With very particular preference, X is $C_6$ alkylene.

The compounds are preferably aliphatic carbonate (meth) acrylates.

As radiation-curable compounds (F1) it is also possible, moreover, to use (meth)acrylates or vinyl ethers of polyether-polyols. These may be monohydric or preferably polyhydric polyether alcohols containing on average from 2 to 70, preferably from 2 to 60, polyalkylene oxide units per molecule, as obtainable conventionally by alkoxylating suitable starter molecules. For preparing these polyether alcohols it is possible to use any desired monohydric or polyhydric alcohols as starter molecules.

Alkylene oxides suitable for the alkoxylation are ethylene oxide, propylene oxide, butylene oxide, iso-butylene oxide, and vinyloxirane, which can be used in any desired sequence or else as a mixture for the alkoxylation reaction.

Examples of suitable starter molecules include trimethylolpropane, trimethylolethane, neopentyl glycol, pentaerythritol, glycerol, ditrimethylolpropane, dipentaerythritol, sorbitol, mannitol, diglycerol, 1,2-propanediol, ethylene glycol, 2,2-dimethyl-1,2-ethanediol, neopentyl glycol, 1,3-propanediol, 1,2-butanediol or 1,4-butanediol.

Polyether alcohols containing vinyl ether groups are obtained, for example, by reacting hydroxyalkyl vinyl ethers with alkylene oxides.

Polyether alcohols containing (meth)acrylic acid groups can be obtained, for example, by transesterifying (meth) acrylic esters with the polyether alcohols, by esterifying the polyether alcohols with (meth)acrylic acid, or by using hydroxyl-containing (meth)acrylates as described above under (F1-b).

Preferred polyether alcohols are polyethylene glycols having a molar mass of between 106 and 2000, preferably between 106 and 898, with particular preference between 238 and 678.

As polyether alcohols it is also possible to use polyTHF having a molar mass of between 162 and 2000 and also poly-1,3-propanediol having a molar mass of between 134 and 1178.

Particularly preferred compounds (F1) are urethane or carbonate (meth)acrylates or urethane or carbonate vinyl ethers, especially urethane (meth)acrylates.

Compounds (F1) are often used in a mixture with compounds (F2), which serve as reactive diluents.

Suitable reactive diluents (compounds (F2)) include radiation-curable, free-radically or cationically polymerizable compounds containing only one ethylenically unsaturated, copolymerizable group.

Mention may be made, for example, of $C_1$-$C_{20}$ alkyl (meth) acrylates, vinylaromatics having up to 20 carbon atoms, vinyl esters of carboxylic acids containing up to 20 carbon atoms, ethylenically unsaturated nitrites, vinyl ethers of alcohols containing from 1 to 10 carbon atoms, α,β-unsaturated carboxylic acids and their anhydrides, and aliphatic hydrocarbons having from 2 to 8 carbons and 1 or 2 double bonds.

For the purposes of this specification, (meth)acrylic acid is a term used to embrace acrylic acid and methacrylic acid.

Preferred (meth)acrylic acid alkyl esters are those with a $C_1$-$C_{10}$ alkyl radical, such as methyl methacrylate, methyl acrylate, n-butyl acrylate, ethyl acrylate, and 2-ethylhexyl acrylate.

Mixtures of the (meth)acrylic acid alkyl esters as well are particularly suitable.

Examples of vinyl esters of carboxylic acids having from 1 to 20 carbon atoms include vinyl laurate, vinyl stearate, vinyl propionate, and vinyl acetate.

α,β-unsaturated carboxylic acids and their anhydrides can be, for example, acrylic acid, methacrylic acid, fumaric acid, crotonic acid, itaconic acid, maleic acid or maleic anhydride, preferably acrylic acid.

Suitable vinylaromatic compounds include vinyltoluene, α-butylstyrene, 4-n-butylstyrene, 4-n-decylstyrene, and, preferably, styrene.

Examples of nitriles are acrylonitrile and methacrylonitrile.

Examples of suitable vinyl ethers are vinyl methyl ether, vinyl isobutyl ether, vinyl hexyl ether, and vinyl octyl ether.

As nonaromatic hydrocarbons that have from 2 to 8 carbon atoms and one or two olefinic double bonds, mention may be made of butadiene, isoprene, and also ethylene, propylene, and isobutylene.

It is also possible to use N-vinylformamide, N-vinylpyrrolidone, and N-vinylcaprolactam.

As photoinitiators (F3) it is possible to use photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Ed.), SITA Technology Ltd, London.

Suitable examples include mono- and bisacylphosphine oxides such as Irgacure® 819 (bis(2,4,6-trimethylbenzoyl) phenylphosphine oxide), such as are described, for example, in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO), ethyl 2,4,6-trimethylbenzoylphenylphosphinate, benzophenones, hydroxyacetophenones, phenylglyoxylic acid and its derivatives or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-iso-propylthioxanthone, 2,4-dichlorothioxanthone, benzoin, benzoin iso-butyl ether, chloroxanthenone, benzoin tetrahydropyranyl ether, benzoin methyl ether, benzoin ethyl ether, benzoin butyl ether, benzoin iso-propyl ether, 7-H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ole, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone, and 2,3-butanedione.

Also suitable are nonyellowing or low-yellowing photoinitiators of the phenylglyoxalic ester type, as described in DE-A 198 26 712, DE-A 199 13 353 or WO 98/33761.

Of said photoinitiators, preference is given to phosphine oxides, α-hydroxy ketones, and benzophenones.

In particular it is also possible to use mixtures of different photoinitiators.

The photoinitiators may be used alone or in combination with a photopolymerization promoter, of the benzoic acid, amine or similar type, for example.

Examples of further, typical coatings additives (F4) that can be used include antioxidants, oxidation inhibitors, stabilizers, activators (accelerators), fillers, pigments, dyes, devolatilizers, luster agents, antistatic agents, flame retardants, thickeners, thixotropic agents, level assistants, binders, antifoams, fragrances, surface-active agents, viscosity modifiers, plasticizers, tackifying resins (tackifiers), chelating agents or compatibilizers.

Accelerators which can be used for the thermal aftercure include tin octoate, zinc octoate, dibutyltin laurate or diazabicyclo[2.2.2]octane, for example.

It is also possible to add one or more photochemically and/or thermally activatable initiators, e.g., potassium peroxodisulfate, dibenzoyl peroxide, cyclohexanone peroxide, di-tert-butyl peroxide, azobis-iso-butyronitrile, cyclohexylsulfonyl acetyl peroxide, di-iso-propyl percarbonate, tert-butyl peroctoate or benzpinacol, and also, for example, thermally activatable initiators which have a half life at 80° C. of more than 100 hours, such as di-t-butyl peroxide, cumene hydroperoxide, dicumyl peroxide, t-butyl perbenzoate, silylated pinacols, available commercially for example under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd edition, Wiley & Sons, New York.

Suitable thickeners besides free-radically (co)polymerizable (co)polymers include customary organic and inorganic thickeners such as hydroxymethylcellulose or bentonite.

As chelating agents it is possible, for example, to use ethylenediamineacetic acid and its salts and also β-diketones.

Suitable fillers include silicates, e.g., silicates obtainable by hydrolysis from silicon tetrachloride, such as Aerosil® from Degussa, siliceous earth, talc, aluminosilicates, magnesium silicates, calcium carbonates, etc.

Suitable stabilizers embrace typical UV absorbers such as oxanilides, triazines, and benzotriazole (the latter obtainable as Tinuvin® grades from Ciba-Spezialitatenchemie), and benzophenones. These may be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are normally used in amounts of from 0.1 to 5.0% by weight, based on the solid components present in the formulation.

Suitable stabilizers further include, for example, N-oxyls, such as 4-hydroxy-2,2,6,6-tetramethylpiperidine-N-oxyl, 4-oxo-2,2,6,6-tetramethylpiperidine-N-oxyl, 4-acetoxy-2,2,6,6-tetramethylpiperidine-N-oxyl, 2,2,6,6-tetramethylpiperidine-N-oxyl, 4,4',4"-tris(2,2,6,6-tetramethylpiperidine-N-oxyl) phosphite or 3-oxo-2,2,5,5-tetramethylpyrrolidine-N-oxyl, phenols and naphthols, such as p-aminophenol, p-nitrosophenol, 2-tert-butylphenol, 4-tert-butylphenol, 2,4-di-tert-butylphenol, 2-methyl-4-tert-butylphenol, 4-methyl-2,6-tert-butylphenol (2,6-tert-butyl-p-cresol) or 4-tert-butyl-2,6-dimethylphenol, quinones, such as hydroquinone or hydroquinone monomethyl ether, aromatic amines, such as N,N-diphenylamine, and N-nitrosodiphenylamine, phenylenediamines, such as N,N'-dialkyl-para-phenylenediamine, in which the alkyl radicals may be identical or different and may each be composed independently of one another of from 1 to 4 carbon atoms and may be straight-chain or branched, hydroxylamines, such as N,N-diethylhydroxylamine, urea derivatives, such as urea or thiourea, phosphorous compounds, such as triphenylphosphine, triphenyl phosphite or triethyl phosphite, or sulfur compounds, such as diphenyl sulfide or phenothiazine.

Typical compositions for radiation-curable compositions are by way of example (F1) 0-100% by weight, preferably 50-90, with particular preference 60-90 and especially 60-80% by weight, (F2) 0-60% by weight, preferably 5-50, with particular preference 6-40 and especially 10-30% by weight, (F3) 0-20% by weight, preferably 0.5-15, with particular preference 1-10 and especially 2-5% by weight, and (F4) 0-50% by weight, preferably 2-40, with particular preference 3-30 and especially 5-20% by weight, with the proviso that (F1), (F2), (F3), and (F4) together make up 100% by weight.

In particularly preferred radiation-curable compositions the compound (F1) is composed of from 10 to 100% by weight, based on the total amount of the compound (F1), of urethane (meth)acrylate(s), epoxy acrylates, polyether acrylates or polyester acrylates.

Particularly suitable radiation-curable compositions which can be used as coats (F) are those described in EP-A1 942 022, particularly from page 4 line 18 to page 18 line 31 therein, those described in DE-A1 199 44 156, page 1 line 26 to page 6 line 63, and in DE-A1 199 56 231, page 2 line 33 to page 4, line 65, and also those described in the German patent application bearing the number 101 40 769.6 and the filing date of Aug. 20, 2001.

The coating of the substrates takes place in accordance with customary techniques known to the skilled worker, in which at least one coating material is applied in the desired thickness to the substrate to be coated and any volatile constituents of the coating material are removed, where appropriate with heating. If desired, this operation may be repeated one or more times. Application to the substrate may take place in a known way, e.g., by spraying, troweling, knifecoating, brushing, rolling, roller application, pouring, laminating, in-mold coating or coextrusion. The coating thickness is generally situated within a range from about 3 to 1000 g/m$^2$ and preferably from 10 to 200 g/m$^2$.

Further disclosed is a method of coating substrates which involves applying the coating material to the substrate and, where appropriate, drying it, curing it with electron beams or by UV exposure under an oxygen-containing atmosphere or, preferably, under inert gas, and subjecting it where appropriate to thermal treatment at temperatures up to the level of the drying temperature and thereafter at temperatures up to 160° C., preferably between 60 and 160° C.

The method of coating substrates may also be implemented in such a way that, following the application of the coating material, thermal treatment is carried out first at temperatures up to 160° C., preferably between 60 and 160° C., followed by curing with electron beams or by UV exposure-under oxygen or, preferably, under inert gas.

The curing of the films formed on the substrate may if desired take place exclusively by means of heat. In general, however, the coatings are cured both by exposure to high-energy radiation and thermally.

Curing may also take place additionally, or instead of the thermal cure, by NIR radiation, NIR radiation here referring to electromagnetic radiation in the wavelength range from 760 nm to 2.5 μm, preferably from 900 to 1500 nm.

Where appropriate it is possible, if two or more coats of the coating material are applied one over the other, for a thermal, NIR and/or radiation cure to take place after each coating operation.

Suitable radiation sources for the radiation cure are, for example, low-pressure, medium-pressure, and high-pressure mercury lamps and also fluorescent tubes, pulsed radiators, metal halide lamps, electronic flash devices, which allow radiation curing without photoinitiator, or excimer radiators. The radiation cure is effected by exposure to high-energy irradiation, i.e., UV radiation or daylight, preferably light in the wavelength range of $\lambda$=200 to 700 nm, with particular preference $\lambda$=200 to 500 nm, and with very particular preference $\lambda$=250 to 400 nm, or by exposure to high-energy electrons (electron beams; 150 to 300 keV). Examples of radiation sources used are, for example, high-pressure mercury vapor lamps, lasers, pulsed lamps (flash lights), halogen lamps or excimer radiators. The radiation dose usually sufficient for crosslinking in the case of UV curing is situated in the range from 80 to 3000 mJ/cm$^2$.

It is of course also possible to use two or more radiation sources for the cure, e.g. from two to four.

These sources may also radiate each in different wavelength ranges.

Irradiation may where appropriate also be carried out in the absence of oxygen, e.g., under an inert gas atmosphere. Suitable inert gases include preferably nitrogen, noble gases, carbon dioxide, or combustion gases. Irradiation may also be carried out with the coating material covered by transparent media. Examples of transparent media include polymer films, glass or liquids, e.g., water. Particular preference is given to irradiation in the manner described in DE-A1 199 57 900.

The invention further provides a method of coating substrates which involves i) coating a substrate with a coating material as described above, ii) removing volatile constituents of the coating material for the purpose of film formation under conditions in which the photoinitiator (C) substantially does not yet form free radicals, iii) if desired, subjecting the film formed in step ii) to high-energy radiation, the film being precured, and then, if desired, machining the article coated with the precured film or contacting the surface of the precured film with another substrate, and iv) curing the film thermally or with NIR radiation to completion.

Steps iv) and iii) here may also be carried out in the opposite order; in other words, the film can first be cured thermally or by NIR radiation and then cured with high-energy radiation.

The present invention additionally provides substrates coated with a multicoat system of the invention.

The present invention likewise provides a method of coating substrates with at least one radiation-curable coating system (F), which involves applying, between the substrate and said at least one radiation-curable coating system (F), an elastic intercoat (D) having a glass transition temperature ($T_g$) of −20° C. or less.

The coating may take place in accordance with one of the abovementioned methods, and the remarks made above apply to the radiation-curable coating systems (F) and the elastic intercoat (D).

The thickness of a coat to be cured such as described may be from 0.1 μm up to several mm, preferably from 1 to 2000 μm, with particular preference from 5 to 1000 μm, with very particular preference from 10 to 500 μm, and in particular from 10 to 250 μm.

For a given system, the fracture-mechanical characteristics are determined by the ratio V of the intercoat thickness ZS (coat (D)) to the total thickness of the intercoat plus the thickness DL of the topcoat, i.e., the sum of the thicknesses of coats (E) and (F) (i.e., V=ZS/(ZS+DL)). The lower the temperatures to which the systems are subject and the higher the deformation rates, the greater the value of V which must be chosen so that fracture does not occur under mechanical stress. In accordance with the invention, values V are at least 0.05 at temperatures of at least 25° C., preferably at least 0.1 at temperatures of at least 0° C., with particular preference at least 0.2 at temperatures of at least −20° C., and with very particular preference at least 0.3 at temperatures of −50° C.

In comparison to known UV-curable coatings, the multicoat systems of the invention achieve improved adhesion, especially to engineering plastics, and also enhanced hardness, elasticity, abrasion resistance, and chemical resistance.

With particular preference, the multicoat systems of the invention are suitable as or in exterior coatings, in other words in applications where the coatings are exposed to daylight, preferably of buildings or parts of buildings, interior coatings, traffic markings, and coatings on vehicles and aircraft. The multicoat systems of the invention are employed in particular as or in automotive clearcoat and topcoat material(s), for both the interior and exterior automotive sectors.

By virtue of the intercoat (D) which is present in accordance with the invention, the multicoat systems of the invention are able to intercept cracks which occur in the outer coating film in such a way that they are unable to propagate into the substrate. For this purpose, it is naturally possible to build two or more elastic intercoats into one multicoat system: for example between coats (E) and (F), and/or between (A) and (C), where these coats are present in the multicoat system.

With the multicoat systems of the invention it is possible to achieve high scratch resistance.

ppm figures and percentages used in this text relate, unless indicated otherwise, to percentages by weight and ppm by weight.

EXAMPLES

The scratch resistance was determined in accordance with the Scotch Brite test, as described in DE-A1 199 40 312, page 8 line 64 to page 9 line 5:

The test specimen is a 3×3 cm, silicon carbide-modified fiber nonwoven (Scotch Brite SUFN, 3M Deutschland, 41453 Neuss, Germany), which is fastened to a cylinder. This cylinder presses the nonwoven against the coating under a load of 750 g and is moved over the coating pneumatically. The path of the deflection is 7 cm. After 10 or 50 double strokes (DS), the gloss (sixfold determination) in the central region of stressing is measured in analogy to DIN 67530, ISO 2813 at an incident angle of 60°. From the gloss values of the coatings before and after mechanical stressing, the difference is formed. The loss of gloss is inversely proportional to the scratch resistance.

The impact strength $a_{cu}$ was measured in accordance with DIN EN ISO 179/1 fU at −50° C.

The topcoat material 1 was prepared from Laromer® LR 8987 from BASF AG, Ludwigshafen, and additives.

The topcoat material 2 was prepared from Laromer® LR 8949 from BASF AG, Ludwigshafen and additives.

The substrates used were as follows:

| Substrate | Primer | Topcoat material | V | $a_{cu}$ at −50° C. [kJ/m$^2$] | f [Hz] | Loss of gloss after 10/50 DS [%] |
|---|---|---|---|---|---|---|
| ASA/PC (Luran SC) | Kraton D1101 | 1 | 0.34 | 100 | 1000 | 18/31 |
| ASA/PC (Luran SC) | Kraton KX222 | 2 | 0.21 | 15 | 1000 | 9/25 |
| ASA/PC (Luran SC) | Vector 8508 | 2 | 0.30 | 90 | 1000 | 12/28 |
| ABS/PA (Terblend N) | Kraton D1101 | 1 | 0.2 | 50 | 1000 | 13/21 |
| ABS/PA (Terblend N) | Kraton D4150 | 2 | 0.13 | 40 | 1000 | 8/22 |
| ABS/PA (Terblend N) | Vector 8508 | 2 | 0.3 | 40 | 1000 | 11/23 |
| SAN (Luran) | Vector D1101 | 1 | 0.1 | 13 | 500 | 9/18 |
| PMMA (Lucryl) | — | — | — | <2 | 500 | 43/63 |

We claim:

1. A multicoat system, on a substrate (A), comprising:

a clear coat of at least one radiation-curable coating system (F) comprising at least one polymer selected from the group consisting of urethane (meth)acrylates, epoxy (meth)acrylates, and polyester acrylates, optionally, at least one coat (E), which is pigmented and/or provided with effect substances, and which is adjacent to and under coat (F), said coat comprised of said coating system (F) and optional coat (E) constituting a topcoat, and at least one elastic intercoat (D), which is located between the substrate (A) and the topcoat, and comprises a thermoplastic elastomer, and has a glass transition temperature ($T_g$) of −20° C. or less (measured in the frequency range up to 1000 Hz), wherein the substrate has an impact strength to DIN EN ISO 179/1fU at 23° C. and 50% humidity of at least 20 kJ/m$^2$, and is selected from the group consisting of SAN (styrene-acrylonitrile copolymers), ABS (acrylonitrile-butadiene-styrene-copolymers), and ASA (acrylonitrile-styrene-acrylate copolymers), and physical mixtures thereof, the ratio (V) of the intercoat thickness (ZS) to the total thickness of the intercoat and the topcoat (DL), expressed as V=ZS/(ZS+DL), in the multicoat system, is at least 0.05 at a temperature of at least 25° C.

and wherein each coat is coextensive with the substrate.

2. The multicoat system as claimed in claim 1, wherein the thickness of the elastic intercoat (D) is from 0.5 to 500 μm.

3. The multicoat system as claimed in claim 1, wherein at least one compound in the elastic intercoat (D) is selected from the group consisting of styrene-butadiene-styrene (SBS) and styrene-ethylene/propylene-styrene (SEPS) block polymers.

4. The multicoat system as claimed in claim 3, wherein the at least one compound in the elastic intercoat (D) is styrene-butadiene-styrene (SBS).

5. The multicoat system as claimed in claim 1, wherein elastic intercoat (D) has a glass transition temperature ($T_g$) of −60° C. or less (measured in the frequency range up to 1000 Hz).

6. The multicoat system as claimed in claim 1, wherein ratio (V) is at least 0.3 at a temperature of −50° C.

7. The multicoat system as claimed in claim 1, wherein at least one compound in the at least one radiation-curable coating system (F) is a urethane (meth)acrylate.

8. The multicoat system as claimed in claim 1, additionally comprising, between (D) and (A):

a second substrate layer (C) of a polymer film, and at least one elastic intercoat (B) between second substrate layer (C) and substrate (A).

9. The multicoat system as claimed in claim 8, wherein said second substrate layer (C) is a film of polypropylene.

10. The multicoat system as claimed in claim 8, wherein said second substrate is selected from the group consisting of PP, SAN, PC, PMMA, PBT, PA, ASA, ABS and their physical mixtures (blends).

11. A third substrate coated with a multicoat system as claimed in claim 1.

12. The third substrate as claimed in claim 11, which is a building component, a vehicle component or an aircraft component.

13. A method of producing the multicomponent system as claimed in claim 1, which comprises applying, between the substrate (A) and said coat of at least one radiation-curable coating system (F), said elastic intercoat (D) having a glass transition temperature ($T_g$) of −20° C. or less.

14. The method of claim 13, wherein the substrate (A) comprises an interior surface or an exterior surface of a structure.

* * * * *